United States Patent
Johnson et al.

(10) Patent No.: US 6,596,168 B2
(45) Date of Patent: Jul. 22, 2003

(54) FILTER ELEMENT AND METHOD FOR THE MANUFACTURE

(75) Inventors: Kerry Johnson, Hornell, NY (US); Olli Högnabba, Kantvik (FI); Bjarne Ekberg, Turku (FI)

(73) Assignee: Outokumpu Oyj, Espoo (FI)

( * ) Notice: Subject to any disclaimer, the term of this patent is extended or adjusted under 35 U.S.C. 154(b) by 124 days.

(21) Appl. No.: 09/760,927

(22) Filed: Jan. 16, 2001

(65) Prior Publication Data

US 2002/0092807 A1 Jul. 18, 2002

(51) Int. Cl.$^7$ .................. B01D 39/00; B01D 24/00; B01D 61/00; B28B 1/00; C04B 33/32
(52) U.S. Cl. ................ 210/510.1; 210/650; 210/331; 210/486; 210/490; 264/610; 264/628; 264/642; 427/245
(58) Field of Search .................. 210/650–654, 210/490, 486, 489, 504, 500.1, 503–506; 55/323; 427/245; 264/59, 62, 610, 600, 602, 628, 632, 642; 510/12

(56) References Cited

U.S. PATENT DOCUMENTS

| | | | | |
|---|---|---|---|---|
| 4,856,204 A | * | 8/1989 | Hindstrom |
| 4,863,656 A | * | 9/1989 | Hindstrom |
| 4,981,589 A | * | 1/1991 | Hindstrom |
| 5,089,299 A | * | 2/1992 | Veen |
| 5,198,007 A | * | 3/1993 | Moyer |
| 5,523,037 A | * | 6/1996 | Kitayama |
| 5,611,931 A | * | 3/1997 | Liu |
| 6,245,698 B1 | * | 6/2001 | Pope |

* cited by examiner

*Primary Examiner*—W. L. Walker
*Assistant Examiner*—Krishnan S Menon
(74) *Attorney, Agent, or Firm*—Morgan & Finnegan, LLP

(57) ABSTRACT

The invention relates to a filter element and its manufacture to be used in removal of liquid from solids containing material to be dried in a capillary suction dryer which filter element contains a ceramic microporous layer having the pore size under 5 micrometer and supported by a ceramic internal layer having recess areas for liquid flowing. The internal layer is made of at least one substrate which continuously surrounds at least one recess area and which ceramic internal layer is surrounded by at least one essentially continuous microporous surface layer.

20 Claims, 2 Drawing Sheets

FILTER ELEMENT AND METHOD FOR THE MANUFACTURE

The invention relates to a ceramic filter element to be used in removal of liquid from solids containing material to be dried in a capillary suction dryer in order that a filter cake of solid material is achieved on at least one surface of the filter element.

The U.S. Pat. No. 4,981,589 concerns a filter construction and a method in particular for capillary suction dryers. The filter construction comprises a first filter material layer of a ceramic material, which is the first layer in relation to the flowing liquid, and a second filter material layer of a ceramic material, connected with said first layer. The first filter material layer acts as the filtering layer proper, and the second filter material layer acts as a layer that supports the construction.

The U.S. Pat. No. 4,863,656 relates to a method for manufacturing a microporous plate and a filter plate obtained from the method. According to the method, a casting mix is introduced into interior of gypsum mold whereupon water is absorbed from the casting mix into the gypsum so that a crust remains on the inner surface of the mold. The crust is allowed to develop to an appropriate thickness whereupon the remaining casting mix is drained from the mold. The inner surfaces of the crust are allowed to dry whereupon the interior space defined between opposed crust wall portions is filled with a granular material which preferably has the same composition as the crust material. A filter plate comprises a pair of opposed suction walls defining an interior space between them which is filled with a granular material.

In those U.S. Pat. No. 4,863,656 and 4,981,589 the ceramic filter plates are manufactured so that the ceramic filter plates have a microporous surface layer having the pore size between 0,5 to 2,0 micrometer and a support layer inside the filter plates. The support layer also contains recess areas for instance for the removal of liquid which is filtered from a material creating a filter cake on the microporous surface of the filter plate. The recess areas are generally shaped on the surface of the supporting layer and for the final manufacturing two opposite sides of the filter plate are glued together. Thus the filter plate made of two opposite sides is very weak in the interface of these opposite sides. Also the properties of the filter plate in that position are quite different from the ones in the other parts of the filter plate.

The object of the present invention is to eliminate drawbacks of the prior art and to achieve a ceramic filter element to be used in removal of liquid from solids containing material to be dried in a capillary suction dryer and a method for its manufacture in which element the desired recess areas are produced without any gluing stage. The essential features of the invention are enlisted in the appended claims.

According to the invention a ceramic filter element to be used in removal of liquid from solids containing material to be dried in a capillary suction dryer has a microporous surface layer where the pore size is under 5 micrometer, preferably between 0,2 to 3,0 micrometer, and this microporous surface layer is supported by at least one substrate. The substrate has means for the removal of liquid from the microporous surface layer. Therefore, the substrate has inside at least one recess area. The filter element has also a fitting area where the substrate of the filter element is in mechanical contact with the capillary suction dryer. In any other areas of the filter element the substrate is advantageously surrounded by at least one essentially continuous microporous surface layer. This means that the ceramic filter element has an essentially continuous filtration surface in any other areas separated from the fitting area with the capillary suction dryer.

When manufacturing the ceramic filter element of the invention the internal layer is formed of at least one substrate. The substrate is preferably made of a ceramic material in a powder form, such as for instance alumina, silicon carbide and titania. The substrate can also be made of a metal or a metal alloy, polymer or graphite. In the preferred embodiment the ceramic material is mixed with a binding medium and liquid so that the ceramic mix formed is suitable for further processing. The ceramic mix is first charged into a mold so that the mold is partly filled with the ceramic mix. The core material for at least one desired recess area is then installed on the surface of the ceramic mix in the mold. Finally the rest of the ceramic mix is charged into the mold. Depending on the shape and the number of the desired recess areas the charging of the ceramic mix into the mold can also be divided to three or more stages. When the total amount of the ceramic mix has been charged into the mold, the ceramic mix is pressed into a green body. After pressing the green body is sintered in the temperature range of 1150–1550° C. During the sintering stage of the green body, the core material for the recess area is burnt out through the porous structure of ceramic mix. Instead of the core material the substrate contains the recess area or areas in a shape of the core material.

After the sintering stage of the substrate containing the desired recess area or areas the substrate is covered by at least one microporous layer. The covering process is preferably carried out by dipping the substrate into a bath of the microporous layer material. The covering process can also carried out for instance by spraying or tape casting the ceramic microporous layer material on the surface of the substrate. The microporous layer material can also be made of a metal or a metal alloy, polymer or graphite. After the covering process the substrate with the microporous layer material is sintered at the temperature range of 1150–1550° C. If further ceramic microporous layer is needed, the covering and sintering process are repeated respectively. After the sintering of the microporous layer the filter element is essentially monolithic having a hierarchical structure and the filter element is then ready for mechanical processing. This means that the filter element is drilled if the hole or holes for the fitting member are not formed with the core material during the previous forming stage so that a fitting member is possible to install to the filter element, if needed. By the fitting member or through the hole or holes the filter element can mechanically be fitted to the capillary suction dryer for the filtration and drying a material which will create a filter cake on the filtration surface of the filter element.

The core material for the recess area in order to manufacture the filter element of the invention can be an organic or inorganic material which keeps its rigidity, when the substrate is pressed by the pressure range of 10–150 bar, preferable 50–80 bar, and the amount of ash after burning is under 5 weight-% from the total weight of the core material. The core material can be advantageously for instance microcrystalline waxes, citronella wax, beeswax or paraffin, a biological material as wood, reed and rush, a polymeric material as plastics or graphite. The core material for a recess area can also be a combination of at least two of these materials.

The core material for the recess area can be also a material which melts, sublimates or vaporizes at temperatures well below the sintering temperature of the ceramic mix. Such materials are for instance ice, dry ice ($CO_2$), metals or metal alloys with a low melting temperature.

In the economical aspects when using the manufacturing method of the invention for the ceramic filter element, labor intense manufacturing times including substrate forming, sintering, microporous layer application and all handling in these steps can be cut essentially when compared to the prior art. Also the utilization of the sintering furnace capacity becomes more efficient. Furthermore, the assembly step of the filter element will be eliminated.

In the technical point of view, an essentially monolithic ceramic structure of the filter element of the invention gives advantages as a more rigid structure, higher temperature and chemical resistance, higher resistance against thermal expansion and better dimensional tolerances in terms of for instance flatness and thickness when compared to a sandwich structure with a glued area of the prior art. Furthermore, additional freedom is given the manufacturing process because modifications in the inner recess area can readily be made without expensive tooling changes. Recess area modifications can be required for tailor-made flow characteristics or optimized bulk volume or void volume ratios.

The invention is illustrated in more details in the appending drawings where

Figure 1:
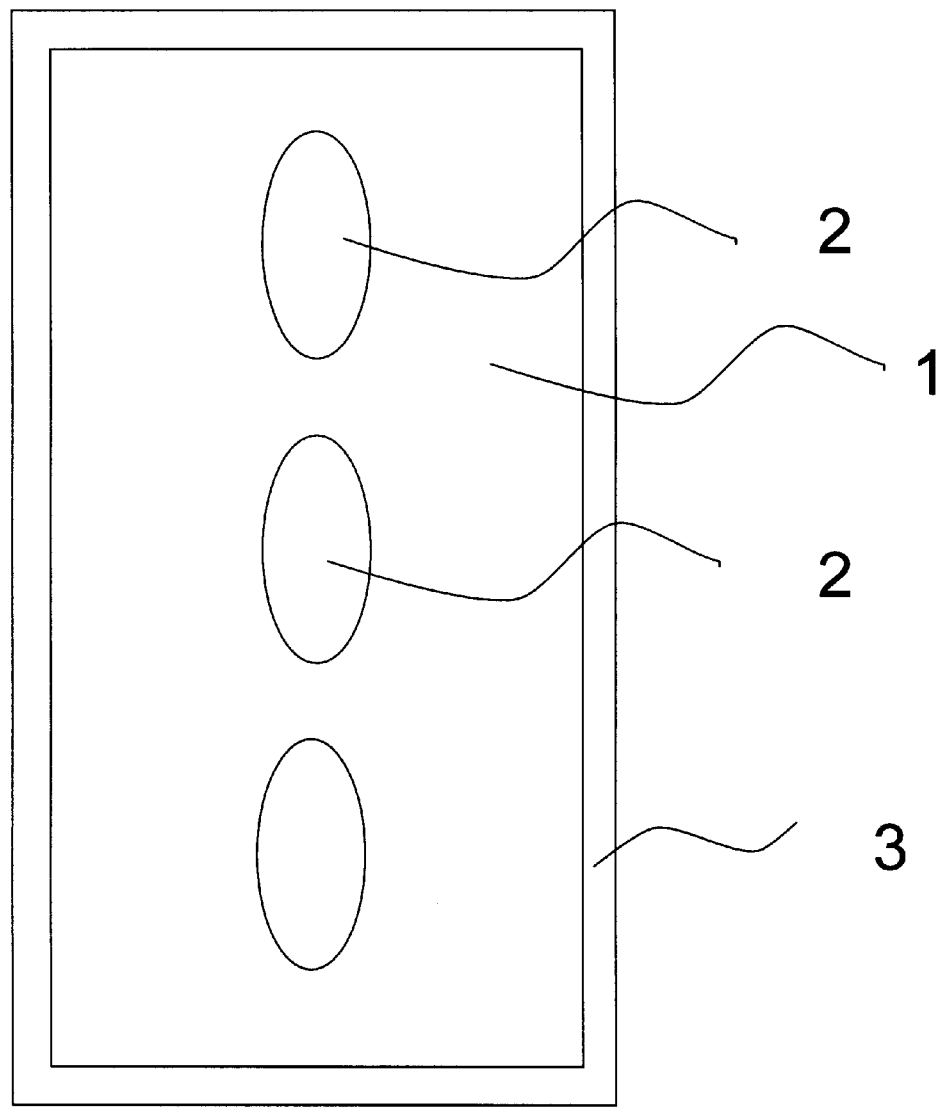
FIG. 1 shows one preferred embodiment of the invention in a cut side-view.

In FIG. 1 the substrate 1 inside the filter element is provided with recess areas 2 for flowing of liquid removed from the material to be dried. The material to be dried is surrounding the filter element and during the drying process a filter cake is created on the surface of the filter element. The substrate 1 is covered with a microporous layer 3. The pore size of the microporous layer is between 0,2 to 3 micrometer and that will make possible that only liquid is flowed through the microporous layer 3. Using the manufacturing method of the invention the substrate 1 and the microporous layer 3 are monolithic and essentially homogenous without any gluing areas between the parts of these layers.

Figure 2:
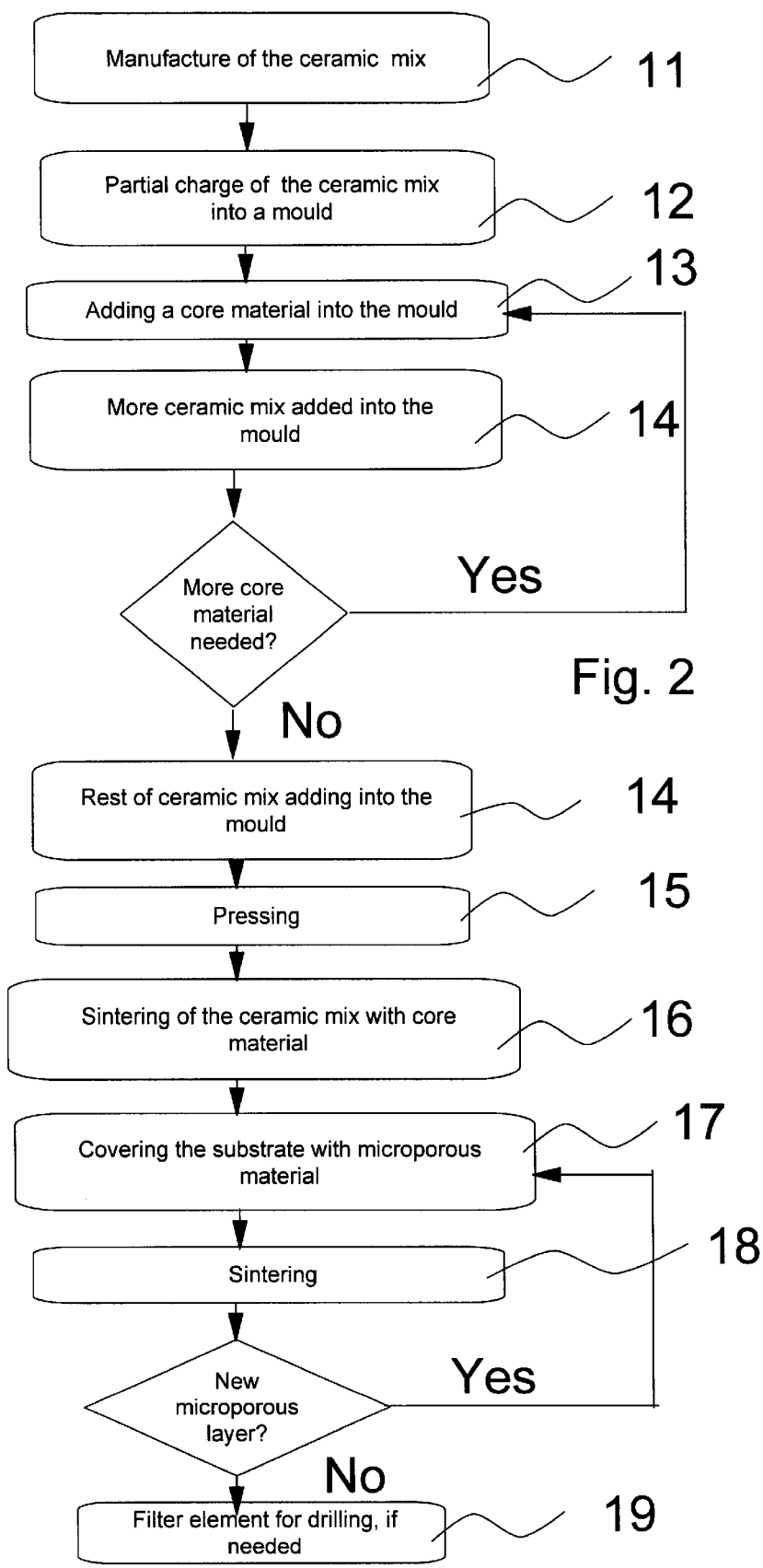
FIG. 2 shows one preferred embodiment of the invention for the manufacturing method as a flow diagram.

FIG. 2 shows a flow diagram for the manufacturing of the ceramic filter element. First, a ceramic mix for the substrate is formed 11. A part of this ceramic mix is charged into a mold 12 and the core material for the recess area or areas is added 13. More ceramic mix is charged into the mold 14. The steps 13 and 14 are repeated, if needed. The green substrate is done by pressing 15 and by sintering 16 and the core material is burnt out from the substrate. The cooled substrate is then dipped 17 into a microporous ceramic material and further, the substrate and the microporous layer are sintered 18 together. If more microporous layers are needed, the steps 17 and 18 are repeated respectively.

Thereafter, the ceramic filter element is drilled 19, if needed, in order to make a fitting area to the filter element in order that the filter element will be fitted to the capillary suction dryer.

What is claimed is:

1. Method for manufacturing a filter element to be used in removal of liquid from solids containing material to be dried in a capillary suction dryer which filter element contains a ceramic microporous layer having the pore size under 5 micrometer and supported by a ceramic internal layer having recess areas for liquid flowing, wherein the method contains at least the steps:

1) a ceramic mix for the substrate is partly charged into a mold,
   2) a substantially solid core material, for at least one recess area, is placed in the mold,
   3) the rest of the ceramic mix for the substrate is charged into the mold,
   4) the ceramic mix with the core material is pressed, thereby forming a green body,
   5) the ceramic mix with the core material is sintered at the temperature range of 1150–1550° C. for creating the substrate,
   6) the substrate is covered by a ceramic microporous material,
   7) the substrate covered by the ceramic microporous material is sintered at the temperature range of 1150–1550° C. for creating a filter element.

2. Method according to the claim 1, wherein the substrate is covered by a microporous material by dipping the substrate into the microporous material.

3. Method according to the claim 1, wherein the substrate is covered by a microporous material by spraying the microporous material on the surface of the substrate.

4. Method according to the claim 1, wherein the substrate is covered by a microporous material using by tape casting the microporous material on the surface of the substrate.

5. Method according to the claim 1, wherein the core material for the recess area is a wax.

6. Method according to the claim 5, wherein the core material for the recess area is paraffin.

7. Method according to the claim 5, wherein the core material for the recess area is beeswax.

8. Method according to the claim 5, wherein the core material for the recess area is microcrystalline wax.

9. Method according to the claim 5, wherein the core material for the recess area is citronella wax.

10. Method according to the claim 1, wherein the core material for the recess area is a biological material.

11. Method according to the claim 10, wherein the core material for the recess area is wood.

12. Method according to the claim 10, wherein the core material for the recess area is rush.

13. Method according to the claim 10, wherein the core material for the recess area is reed.

14. Method according to the claim 1, wherein the core material for the recess area is a polymeric material.

15. Method according to the claim 14, wherein the core material for the recess area is plastics.

16. Method according to the claim 1, wherein the core material for the recess area is graphite.

17. Method according to the claim 1, wherein the core material for the recess area is ice.

18. Method according to the claim 1, wherein the core material for the recess area is dry ice.

19. Method according to the claim 1, wherein the core material for the recess area is a combination of at least two materials.

20. The method of claim 1 wherein the filter element is drilled to form a fitting area for fitting the filter element to a capillary suction dryer.

* * * * *